(12) United States Patent
Grecco

(10) Patent No.: US 7,508,556 B2
(45) Date of Patent: Mar. 24, 2009

(54) GLASS PLATE FILM HOLDER FOR SCANNERS

(76) Inventor: Michael Grecco, 1701 Pier Ave., Santa Monica, CA (US) 90405

( * ) Notice: Subject to any disclaimer, the term of this patent is extended or adjusted under 35 U.S.C. 154(b) by 1037 days.

(21) Appl. No.: 10/825,770

(22) Filed: Apr. 16, 2004

(65) Prior Publication Data

US 2004/0207888 A1    Oct. 21, 2004

Related U.S. Application Data

(60) Provisional application No. 60/463,540, filed on Apr. 18, 2003, provisional application No. 60/463,846, filed on Apr. 18, 2003.

(51) Int. Cl.
*H04N 1/46* (2006.01)
*H04N 1/04* (2006.01)

(52) U.S. Cl. .................. 358/505; 358/487; 358/474; 358/506

(58) Field of Classification Search .......... 358/505, 358/487, 474, 506, 488, 497, 496, 498; 399/377, 399/378, 379; 355/75
See application file for complete search history.

(56) References Cited

U.S. PATENT DOCUMENTS

| | | | | |
|---|---|---|---|---|
| 5,666,611 | A * | 9/1997 | Chuan | 399/378 |
| 5,946,110 | A * | 8/1999 | Hu et al. | 358/474 |
| 6,031,639 | A * | 2/2000 | Hu et al. | 358/474 |
| 6,078,409 | A * | 6/2000 | Kunishige | 358/487 |
| 6,208,438 | B1 * | 3/2001 | Watanabe et al. | 358/488 |
| 6,829,065 | B1 * | 12/2004 | Lee et al. | 358/474 |
| 6,930,806 | B2 * | 8/2005 | Han et al. | 358/497 |
| 7,031,028 | B2 * | 4/2006 | Liu et al. | 358/505 |
| 7,310,172 | B2 * | 12/2007 | Dowdy et al. | 358/487 |
| 2003/0189735 | A1 * | 10/2003 | Kurosawa | 358/474 |
| 2005/0094224 | A1 * | 5/2005 | Shilling | 358/487 |

OTHER PUBLICATIONS imaging-resource.com, Nikon Super Coolscan 8000 ED Film and Slide Scanner.
imagingsciences.com, Kami Mounting Fluid.
West Coast Imaging, How We Prepare Your Images for Scanning.

* cited by examiner

*Primary Examiner*—Houshang Safaipour
(74) *Attorney, Agent, or Firm*—Ostrager Chong Flaherty & Broitman P.C.

(57) ABSTRACT

The invention provides a film holder for an advanced scanner having a notched and grooved frame surrounding a central support, preferably a glass plate. The frame contains grooves along the side edges of the frame that correspond with accepting gears of a scanner such as a 4,000-dpi scanner. The central support provides a mounting surface for a piece of film to be scanned, wherein the film is mounted on the central support with a mounting fluid. The mounting fluid smoothes over imperfections in the film and central support, and holds the film secure to the support over the entire surface area of the film, thereby improving scan quality.

10 Claims, 3 Drawing Sheets

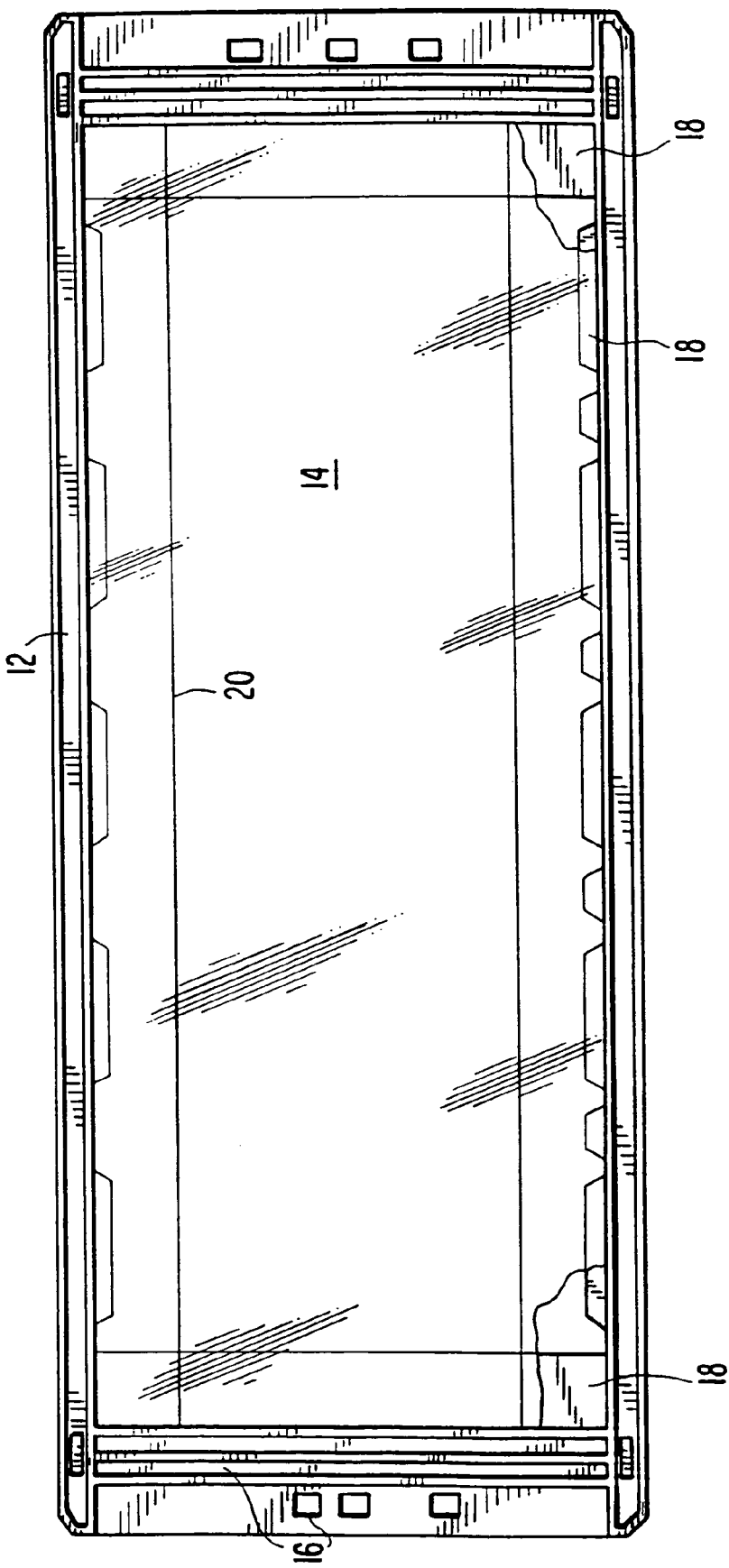

GLASS PLATE FILM HOLDER FOR SCANNERS

RELATED APPLICATION

This application claims the benefit of U.S. Provisional Application Ser. Nos. 60/463,540, filed Apr. 18, 2003 and 60/463,846 filed Apr. 18, 2003.

FIELD OF THE INVENTION

This invention generally relates to a film holder for scanning fluid or oil mounted film. In particular, the invention provides a film holder with a grooved and notched outer frame and a central support interior for the purpose of mounting film in preparation for scanning the film in a 4,000 dpi scanner such as the Nikon Coolscan 8000ED (Nikon, Japan).

BACKGROUND OF THE INVENTION

In order to place a photographic image onto a personal computer or similar electronic device, photographic film of various millimeter definitions may be scanned onto the computer with use of a scanner. Various types of scanners exist in the marketplace for this purpose, including scanners that use extra low dispersion lens technology, such as the Nikon Coolscan 8000ED.

Typically, in order to properly scan a film with such a scanner, the film must be held in place by a film holder prior to being fed into the scanner. Current film holders for 8000ED scanners rely on anti-newton glass shields with an airspace between the film lying on a bottom shelf and the glass shields above it, as shown in prior art FIG. 1. These film holders require a user to feed the film between the glass shields and the bottom shelf. The film is held secure within the film holder with hook-like clamps that extend upwards from the edges of the bottom shelf and pressure the edges of the film.

These film holders, however, are problematic in that the anti-newton glass diminishes scan quality. Moreover, as the film is only held secure by clasps along the outside of the film and not by the central regions, the central region may bend and buckle, thereby reducing scan quality. The airspace that exists between the glass and the film provides an area in which the film may be allowed to bend or buckle, increasing the potential for reduction in film scan quality.

Further, these film holders do not cure flawed areas of the film. As a result, if the film has scratches on its surface, the scratches may scatter light during the scanning process, thereby reducing scan quality.

Therefore, there remains a need for improved film holders for use with 4,000-dpi film scanners.

SUMMARY OF THE INVENTION

The present invention seeks to overcome these problems by providing a film holder having a frame, a seat and a central support, wherein the frame has an upper surface, an interior portion and a thickness. The upper surface is notched and grooved to correspond with a feeding device of a 4,000-dpi optical-resolution scanner such as the Nikon Coolscan 8000ED (Nikon, Japan). The seat has a thickness substantially less than the thickness of the frame and is integrally formed to the interior portion of the frame. The central support is adhered on top of the seat.

The invention also provides a method for using the above film holder with a 4,000-dpi optical-resolution scanner comprising the steps of preparing and cleaning the film holder, wherein the film holder comprises a frame notched and grooved to correspond with a feeding device of a 4,000-dpi optical-resolution scanner, a seat integrally formed to an interior side of the frame, and a central support adhered on top of the seat; adding several drops of a mounting fluid onto the central support, placing a film on the central support on top of the fluid, adding additional drops of the mounting fluid on top of the film, placing a strip of optical acetate on the film, removing any air bubbles with a scratch free wipe and placing the film holder in the scanner.

BRIEF DESCRIPTION OF THE FIGURES/DRAWINGS

FIG. 3 is a top view of the glass plate film holder with grooved frame.

DETAILED DESCRIPTION

Figure 2:
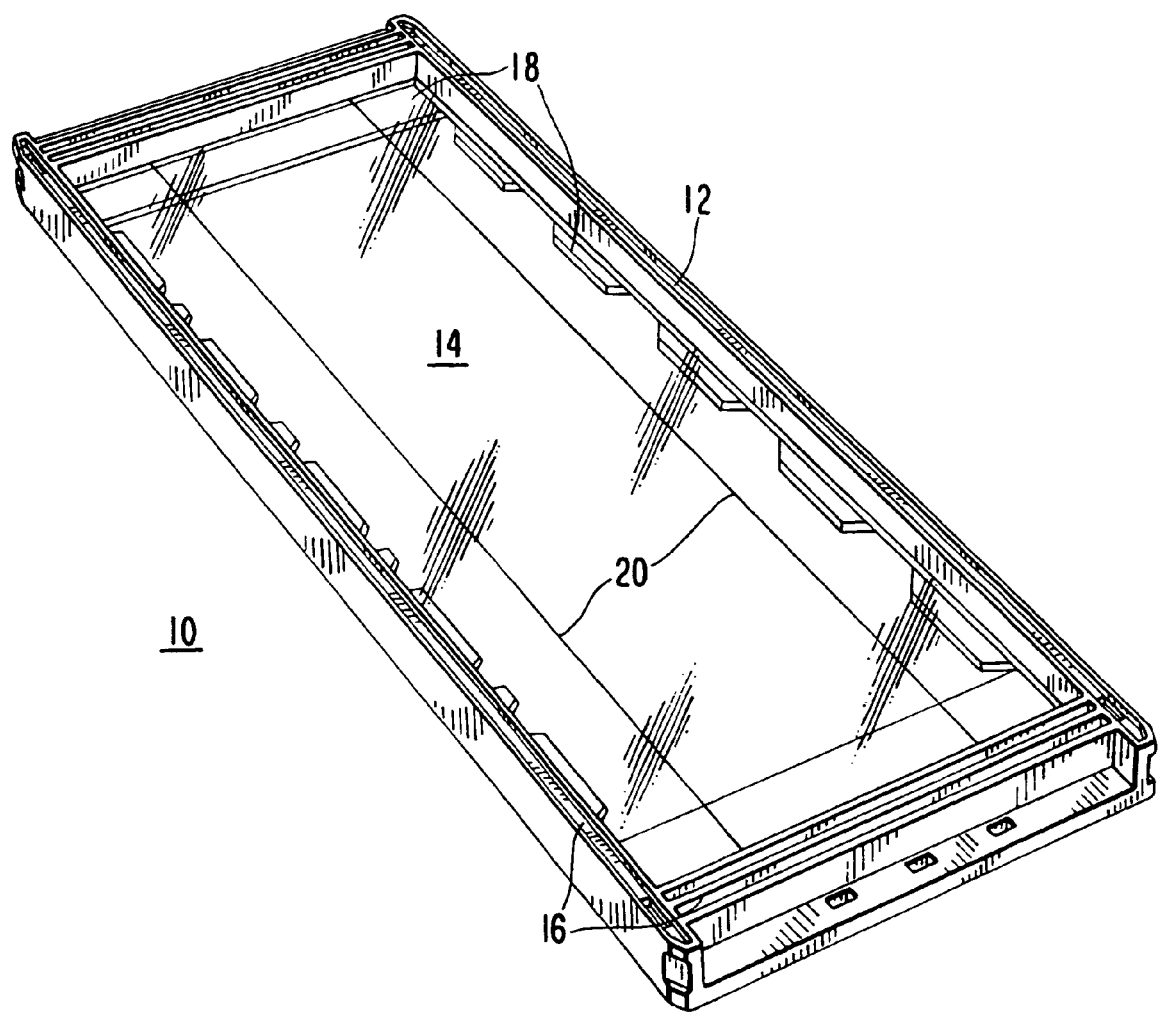
FIG. 2 is a perspective view of the glass plate film holder with grooved frame.

A film holder 10 in accordance with one embodiment of the invention is shown in FIGS. 2 and 3. The film holder 10 is formed with a notched and grooved frame 12 that surrounds a central support 14. The central support is preferably a polished glass plate or a related material. The frame 12 and central support 14 are preferably rectangular, wherein the dimensions of the frame are preferably approximately between 5 and 5.25 inches wide and 13.25-13.75 inches long, with a width of about 0.25-0.5 inches. The central support is cut to fit inside the frame. However, the exact dimensions and shape of the holder can vary within the spirit of the invention to correspond with the individual requirements of a related scanning apparatus.

Frame 12 is preferably made of a plastic material and is grooved and notched to facilitate transport through a film scanner, preferably a 4,000-dpi scanner such as the Nikon Coolscan 8000ED (Nikon, Japan). The frame contains vertical grooves, ridges and notches 16 along four side edges of the frame. The grooves correspond with gears of the scanner, such that the gears engage the grooves of the frame and feed the holder into and through the scanner until completion.

In one embodiment, grooves 16 on frame 12 include three ridges on one side edge that run generally parallel to each other in close proximity: an inner, a central and an outermost ridge. The three ridges form two channels on either side of the central ridge. A similar layout is formed on an opposing side edge of the frame. These side edges also include ledges outside of the outermost ridge. Each ledge has a series of cut holes, as shown in FIG. 3, to help feed the holder into the scanner. Tracks run along the tops of the remaining two side edges. Each track comprises a centrally located recessed groove that runs the length of the side edge. The tracks engage the scanner and help move the film holder through the entirety of the scanner.

The central support 14, preferably a polished glass plate, fits within the frame on top of the seat 18. The support is preferably 1/16 of an inch thick, although it may vary slightly within the spirit of the invention.

Further, the central support may contain central lines 20 that traverse the support parallel to each other. These central lines provide an indicator as to the placement on the holder of a piece of film to be scanned. The lines are displaced from each other at a distance that is generally equal to the width of a piece of film to be scanned. The central lines may be placed on the support through a variety of ways, such as etching or embossing the lines on the support's surface, or by engraving the lines within the support's interior.

Alternatively, the location in which to put the film can be marked by masking portions of the central support. In this embodiment, the areas outside of the film-placing location are shaded differently from the areas inside the film-placing location, thereby outlining the central location in which to place a piece of film. Preferably, the outside areas are darkened or blackened. The darkening reduces light reflection during the scanning process, improving scan quality. The support can be darkened or blackened with a mask or other means known in the art.

The film holder is for any film smaller than 4 inches wide. Thus, the holder is compatible with 8 mm, 16 mm 35 mm and 70 mm movie film, 110, 35, aps, 2¼ and 4×5 still photography film and with any compatible scanner. Certain scanners, however, may only be able to scan film widths up to a predetermined maximum width.

Figure 1:
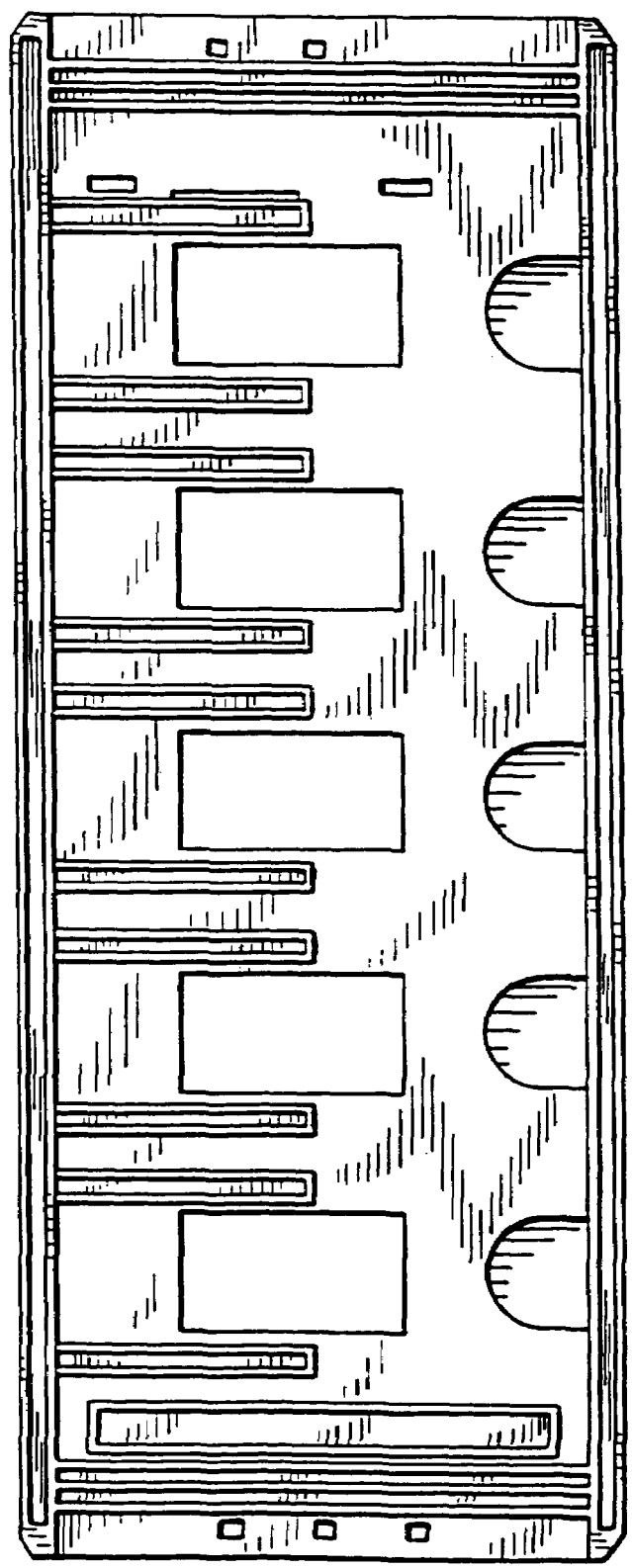
FIG. 1 is a top view of a prior art film holder having anti-newton glass plates over a bottom shelf.

The film holder can generally be formed from milling a prior art film holder intended for use with the 8000ED. One such holder is a Nikon FH-836M 35 mm Mounted Slide Holder, shown in FIG. 1. One way to mill the film holder is to secure the film holder flat on a fixture that is attached to a computer-numerical-controlled (CNC) milling machine. The milling machine cuts through the entirety of the thickness of the film holder, removing a large section of the holder's bottom shelf. Preferably, the large section is a generally rectangular shape that corresponds to the shape of the film holder itself, leaving a small portion of the bottom shelf intact just inside the frame. The milling machine is then used to make a slightly larger pass and a thinner depth, thereby providing seat 18 along the inner portions of the frame to which the central support to attached.

As a result of the milling, the holder has a frame with an upper surface that is notched and grooved to correspond with a feeding device of a 4,000-dpi optical-resolution scanner, and interior sides that face toward the center of the holder. Seat 18, thinner than the original bottom shelf and substantially thinner that the thickness of the frame, is integrally formed along the interior sides of the frame such that an interior side of the seat outlines a void in the center of the holder. The outlined void can be any shape, but is generally a rectangular shape. However, the seat need not extend along the entire interior side of the frame. Gaps in the seat may exist while maintaining the spirit of the invention, as seen in FIGS. 2 and 3.

The central support is then attached on top of seat 18. To attach the support to the seat, a thin layer of sealant, such as silicone, is placed under support 14. The support is placed on seat 18 and sealed. Preferably, a bead of sealant is also placed on top of the support after placement. This holds the support in place and forms a seal to prevent liquid from dripping through the holder. Thus, excess fluid does not drip into the scanning mechanism during scanning.

The resultant film holder, as seen in FIGS. 2 and 3, has the central support 14 located securely within frame 12 on top of seat 18 such that there is a space between an upper surface of the central support and an upper surface of the frame. The space is sufficiently large enough to accommodate a piece of film to be scanned and to position the film at the appropriate distance from the scanning mechanism to ensure proper focus during scanning.

In one method to use the holder, the film to be scanned is adhered to the plate with a fluid that holds the film flat to the plate across the entire area of the film, not just along the edges, improving scan quality. The fluid also smoothes over scratches and fills in gaps in the film and central support. Thus, by mounting the film to the plate with a fluid, the imperfections in both the film and the glass are filled in with the fluid, improving scan quality dramatically.

In one embodiment, the holder, specifically the central support, is first cleaned, preferably with a non-ammonia glass cleaner, and further dusted clear of debris. A few drops of fluid are then added on the central support. The fluid used for this purpose can be any fluid known in the art, such as Kami mounting fluid (Kami, Japan).

The film to be scanned is placed on the central support on top of the fluid, holding the film secure. If the central support has center lines delineating where to put the film, the film is placed between the central lines. Additional drops of fluid are added on top of the film, to further secure the film for scanning and improve the quality of the film.

With the film firmly held in place, a strip of optical acetate may be placed on the full image to be scanned. The film is then removed of any possible air bubbles, preferably by wiping it with a scratch free wipe. The tray is then placed in the scanner as normal. Generally, there are preferably arrows molded on the surface of the holder that indicate the direction of insertion into the scanner.

Although the invention has been described with reference to preferred embodiments, it will be appreciated by one of ordinary skill in the art that numerous modifications are possible in light of the above disclosure. For example, the central line imprint or mask may be of various shades and colors. All such variations and modifications are intended to be within the scope and spirit of the invention as defined in the claims appended hereto.

I claim:

1. A method for using a film holder with a 4,000-dpi optical-resolution scanner comprising the steps of:
    preparing and cleaning a film holder, the film holder comprising a frame having an upper surface, an interior portion and a thickness, wherein the upper surface has four side edges such that a first two opposing side edges each have an inner, a central and an outermost ridge, wherein the three ridges form two channels on either side of the central ridge, and a ledge outside the outermost ridge, and a second two opposing side edges each have tracks comprising a centrally located recessed groove that runs the length of the second two opposing side edges, a seat integrally formed to the interior portion of the frame such that the seat extends toward a center of the holder, the seat having a thickness substantially less than the thickness of the frame, and a central support adhered on top of the seat,
    adding drops of a mounting fluid on the central support,
    placing a film on top of the mounting fluid,
    adding drops of the mounting fluid on top of the film,
    placing a strip of optical acetate on the film,
    removing any air bubbles from the film, and
    placing the film holder in the 4,000-dpi optical-resolution scanner.

2. The method of claim 1, wherein the central support is a glass plate.

3. The method of claim 1, wherein the central support is 1/16 of an inch thick.

4. The method of claim 1, wherein the central support further comprises two central lines traversing the central support in parallel, wherein the film is placed between the two central lines.

5. The method of claim 1, wherein the central support has portions masked, and wherein the film is placed within an area outlines by the mask.

6. A method for using a film holder with a scanner comprising the steps of:
preparing and cleaning a film holder, the film holder including a central support for supporting a film,
adding drops of a mounting fluid on the central support,
placing the film on top of the mounting fluid,
adding drops of the mounting fluid on top of the film,
placing a strip of optical acetate on the film,
removing any air bubbles from the film, and
placing the film holder in the scanner.

7. The method of claim 6, wherein the central support is a glass plate.

8. The method of claim 6, wherein the central support further comprises two central lines traversing the central support in parallel, wherein the film is placed between the two central lines.

9. The method of claim 6, wherein the central support has portions masked, and wherein the film is placed within an area outlines by the mask.

10. A method for using a film holder with a scanner comprising the steps of:
preparing and cleaning a film holder, the film holder including a central support for supporting a film, wherein the central support is a glass plate,
adding drops of a mounting fluid on the central support,
placing the film on top of the mounting fluid,
adding drops of the mounting fluid on top of the film,
placing a strip of optical acetate on the film,
removing any air bubbles from the film, and
placing the film holder in the scanner.

* * * * *